(12) United States Patent
Emerson

(10) Patent No.: US 10,781,645 B2
(45) Date of Patent: Sep. 22, 2020

(54) DOUBLE SEAL FOR TRI-LEAD STYLE PACKER PENETRATORS AND METHOD OF INSTALLATION

(71) Applicant: QUICK CONNECTORS, INC., Houston, TX (US)

(72) Inventor: Tod D. Emerson, Magnolia, TX (US)

(73) Assignee: QUICK CONNECTORS, INC., Houston, TX (US)

(*) Notice: Subject to any disclaimer, the term of this patent is extended or adjusted under 35 U.S.C. 154(b) by 116 days.

(21) Appl. No.: 15/779,594

(22) PCT Filed: Dec. 1, 2016

(86) PCT No.: PCT/US2016/064469
§ 371 (c)(1),
(2) Date: May 29, 2018

(87) PCT Pub. No.: WO2017/096074
PCT Pub. Date: Jun. 8, 2017

(65) Prior Publication Data
US 2019/0178039 A1    Jun. 13, 2019

Related U.S. Application Data

(60) Provisional application No. 62/261,588, filed on Dec. 1, 2015.

(51) Int. Cl.
*E21B 17/02* (2006.01)
*H02G 15/013* (2006.01)

(52) U.S. Cl.
CPC ......... *E21B 17/023* (2013.01); *H02G 15/013* (2013.01)

(58) Field of Classification Search
CPC .......................... E21B 17/023; H02G 15/013
See application file for complete search history.

(56) References Cited

U.S. PATENT DOCUMENTS

| | | | |
|---|---|---|---|
| 3,609,651 A | 9/1971 | Sladek et al. | |
| 4,727,223 A | 2/1988 | Lee et al. | |
| 5,478,970 A * | 12/1995 | Lawler | E21B 17/023 174/74 R |
| 5,667,008 A | 9/1997 | Moore | |
| 5,670,747 A | 9/1997 | Lawer et al. | |
| 5,853,113 A | 1/1998 | Small et al. | |

* cited by examiner

*Primary Examiner* — Brad Harcourt
(74) *Attorney, Agent, or Firm* — MH2 Technology Law Group LLP

(57) ABSTRACT

A packer penetrator seals each of a plurality of tubes within an enclosed penetrator body having a seal against the tubes and a seal against a seal bushing enclosing each of the plurality of the tubes. The method of installing this assembly whereby a manifold bushing is fed over the tubes and seated into the packer penetrator, then the penetrator is sealed using one or more rings with a top seal by tightening down a manifold bushing nut. Each tube is then sealed by passing it through the top seal and either sealed using a ferrule and nut seal or a top-hat and nut seal. Thus, each electrical conductor in the tube is sealed, and the packer penetrator is also sealed against the elements.

10 Claims, 6 Drawing Sheets

DOUBLE SEAL FOR TRI-LEAD STYLE PACKER PENETRATORS AND METHOD OF INSTALLATION

The present invention relates to a packer penetrator apparatus; more specifically to a seal for conveying three conductors through a packer assembly, allowing a seal around each electrical conductor.

BACKGROUND OF THE INVENTION

The use of electrical submersible pumps (ESPs) and mineral insulated (MI) cables in well bores has created a problem of sealing the conductors for the ESP or MI cable as it transits through a packer or wellhead from the wellbore to the other side of the packer or wellhead. The present invention, seals at both the conductor and the packer, thus forestalling problems with the ESP or MI cables.

SUMMARY OF THE INVENTION

A penetrator packer seal for three conductors that is made up of one or more tubes inserted in a seal bushing and sealed against the tube using a nut and compression ring seal threaded onto a seal bushing. This top assembly compresses a pressure seal about each of the tubes and a seal bushing is sealed within a manifold bushing by compression of a ferrule using a manifold nut. This seal bushing can have a lipped lower edge for engaging a grooved edge of the manifold bushing, that seats together upon compression. The seal bushing and manifold bushing can also be compressively sealed with a non-metallic seal between the manifold bushing and the seal bushing. Threads formed on an exterior end of the manifold bushing allow connection to a packer.

Alternatively, one or more tubes may be inserted into a seal bushing and a nut connected to the seal bushing compressing a pressure seal about each of the plurality of tubes and a seal bushing being sealed within a manifold bushing by a second pressure seal in compression with a second nut connected on said manifold bushing. Each tube is sealed with a different length seal body allowing the tightening of each nut seal in turn facilitating installation.

A method for assembling a sealed packer penetrator can comprise the steps of sliding a manifold bushing over the tubes coming from a packer or wellhead, attaching it to the packer by threading the end of the manifold bushing to the packer, sliding a nut over the body a top seal and thread over the tubes, tightening the nut of the top seal to the manifold bushing, sliding the seal body onto the first tube and threading it to the top seal, and sliding the ferrule ring and nut onto the same tube and tightening to seal the tube, continuing with each tube using an elongated seal bodies. The manifold bushing can be connected to the top seal using one or more ferrule sealing rings.

Alternatively, a sealed packer penetrator may be assembled by sliding a manifold bushing over the tubes coming from a packer or wellhead, and threading that manifold to a packer; then inserting the top seated seal bushing through a manifold bushing nut, tightening the manifold bushing nut to the bushing manifold, inserting a top-hat seal through the top-hat nut, sliding that top-hat assembly over the tubes, seating the top-hat assembly onto the seated seal bushing with anti-torque pins, and tightening the top-hat seal to the seated seal bushing using the top-hat seal threads.

DETAILED DESCRIPTION OF THE DRAWINGS OF SEVERAL EMBODIMENTS OF THE INVENTION

DETAILED DESCRIPTION OF THE INVENTION

Figure 1:
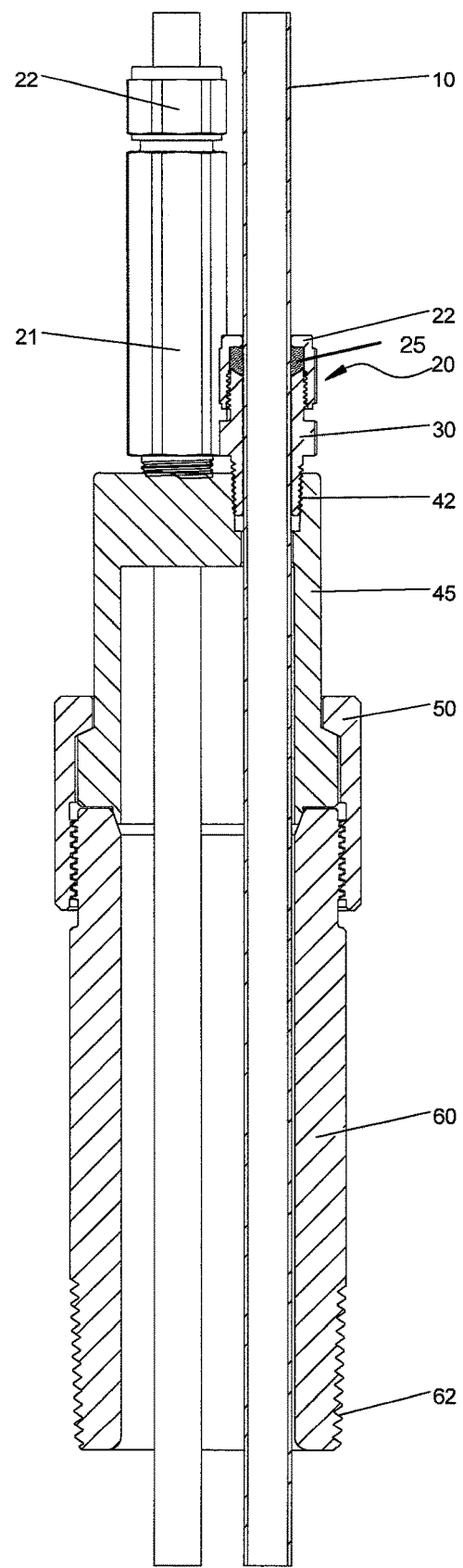
FIG. 1 is a cross-sectional view of the first embodiment of the seal apparatus.

FIG. 1 is a cross sectional view of the first embodiment, showing one of the tubes 10 extending through an ebrasured top manifold bushing 60 and passing through the top of a lipped edge seal bushing 45. The ebrasured top manifold bushing 60 is compressively sealed to the lipped edge seal bushing 45 by the manifold bushing nut 50. The ebrasured top manifold bushing 60 can be fed into a wellhead or a packer using the exterior threads 62 on the manifold bushing 60. The embrasure edge of the manifold bushing and the lipped seal bushing provide an interior seal when compressed. The tube is then fed through the top ferrule seal 20, which is comprised of the seal body 30 and the first nut 22 and a non-metallic compression ring seal 25 between the seal body 30 and the first nut 22. The seal body 30 has exterior threads 42 which allow the lipped edge seal bushing 45 to compressively seal together. The top ferrule seal 20, is sealed compressively by the first nut 22 and the non-metallic compression ring seal 25. This embodiment also shows an extended top ferrule seal 21, which allows each of the tubes to be compressively sealed in turn as was done with top ferrule seal 20.

Figure 2:
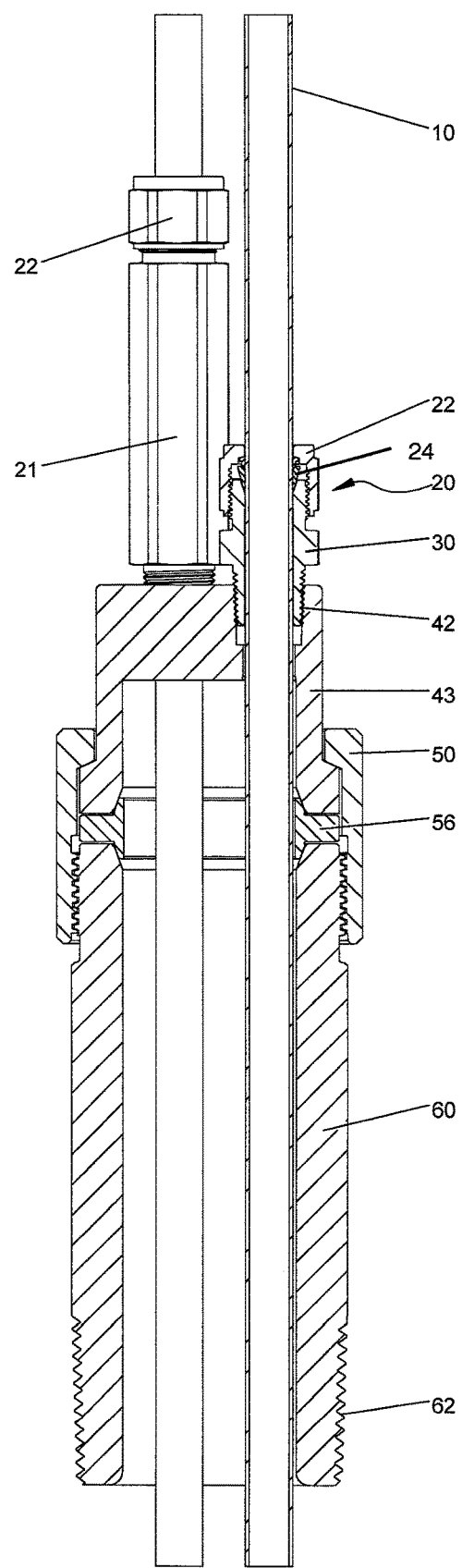
FIG. 2 is a cross-sectional view of an alternative embodiment of the seal apparatus using a seal ring to join the seal bushing and the manifold bushing.

FIG. 2 shows an alternative embodiment of a cross-sectional view of the invention showing the tube 10 extending through the ebrasured top manifold bushing 60 and passing through the top of the seated seal ring bushing 43. The manifold bushing having an ebrasured top 60 is compressively sealed to the seated seal ring bushing 43 by the manifold bushing nut 50. In this embodiment, instead of the manifold bushing 60 and the seal bushing 43 being mated directly, a seal ring 56 is used. Again, the ebrasured top manifold bushing 60 can be connected into a wellhead or a packer using the exterior threads 62 on the manifold bushing 60. The tube is then feed through the top ferrule seal 20, which is comprised of the seal body 30 and the first nut 22. The seal body 30 is compressed into the seal bushing with a lipped edge 45 using threads 42. Then, the top ferrule seal 20 is sealed compressively by the first nut 22 and a metallic compression ring seal 24. This embodiment also shows an extended top ferrule seal 21, which allows each of the tubes to be compressively sealed in turn as was done with top ferrule seal 20.

Figure 3:
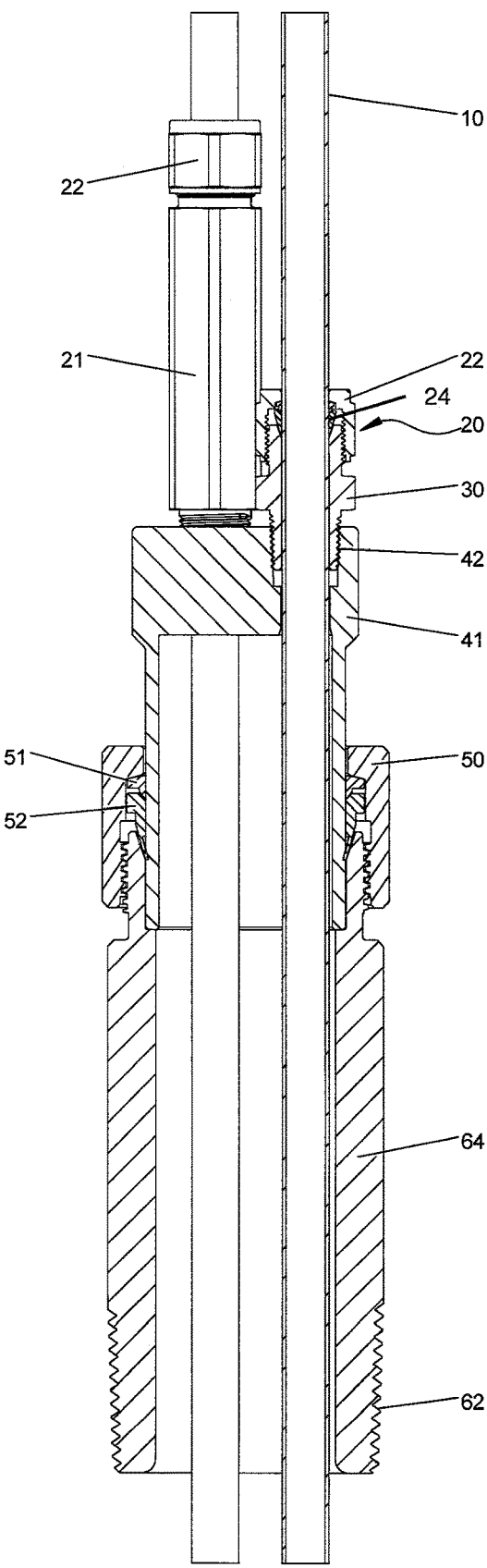
FIG. 3 is a cross-sectional view of an alternative embodiment.

FIG. 3 shows an alternative embodiment of a cross-sectional view of the invention where the tube 10 extending through the manifold bushing with a threaded mandrel 64 pass through the top of the seated seal bushing 41. The manifold bushing with a threaded mandrel 64 is compressively sealed with the seated seal bushing 41 using the manifold bushing nut 50 to compress a front 52 and a rear 51 ferrule sealing the manifold bushing. Again, the manifold bushing 64 can be fed into a wellhead or a packer (not shown in this view) using the exterior threads 62 on the manifold bushing 64. The tube 10 is then fed through the top ferrule seal 20, and sealed as before.

Figure 4:
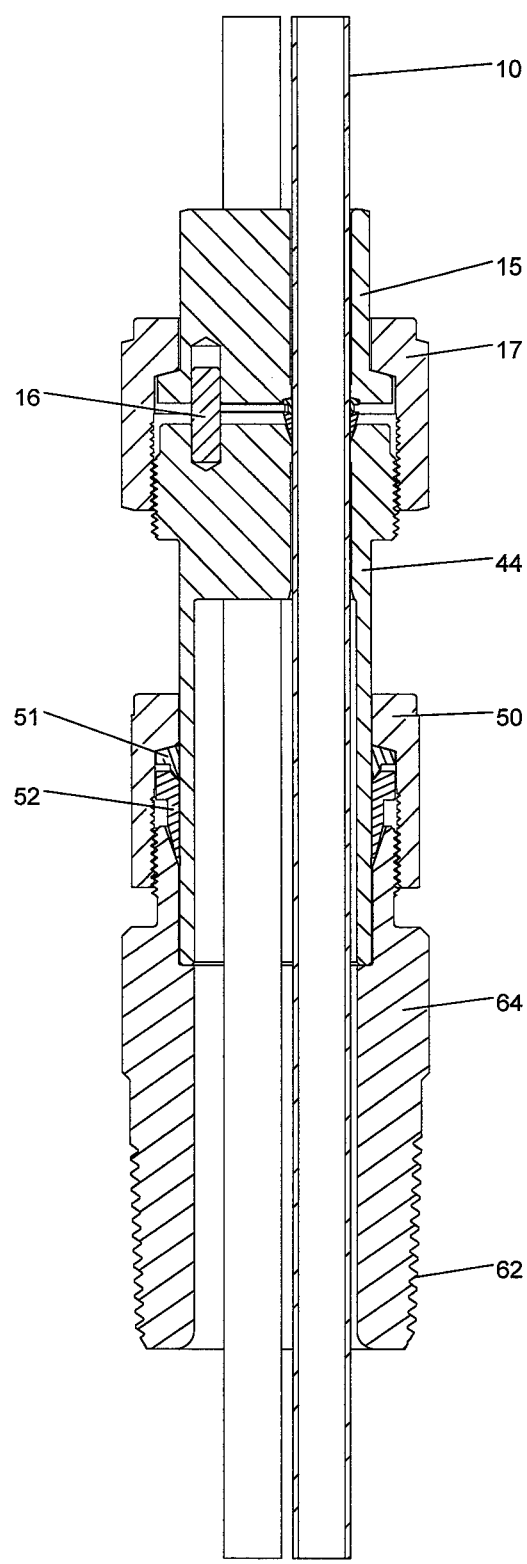
FIG. 4 is a cross-sectional view of an alternative embodiment having a top-hat seal with anti-torque pins.

FIG. 4 shows yet another alternative embodiment of the invention with a top-hat seal containing an anti-torque pin. The tube 10 extends through the manifold bushing with a threaded mandrel 64 and is sealed as described in FIG. 3. This top assembly is then sealed using a top-hat seal 15 with an anti-torque pin 16 inset in the body of seated seal bushing 41 and compressed using a top-hat nut 17.

Figure 5:
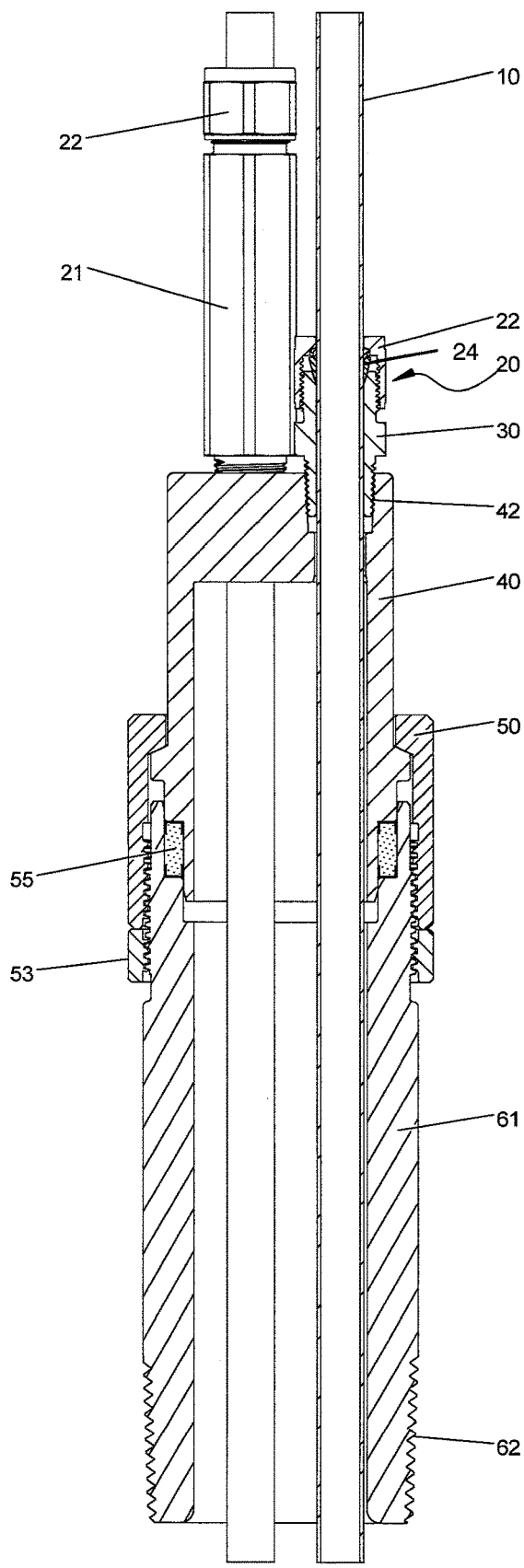
FIG. 5 is a cross-sectional view of an alternative embodiment using non-metallic seals in the manifold bushing.

FIG. 5 shows an alternative embodiment that seals the seated manifold bushing 61 using a non-metallic seal 55 to seal the manifold assembly to the seal body 40. The manifold bushing nut 50 is held in place by a lock ring 53 preventing the loosening of the manifold bushing nut 50. The tube 10 is then individually sealed as described in previous figures.

Figure 6:
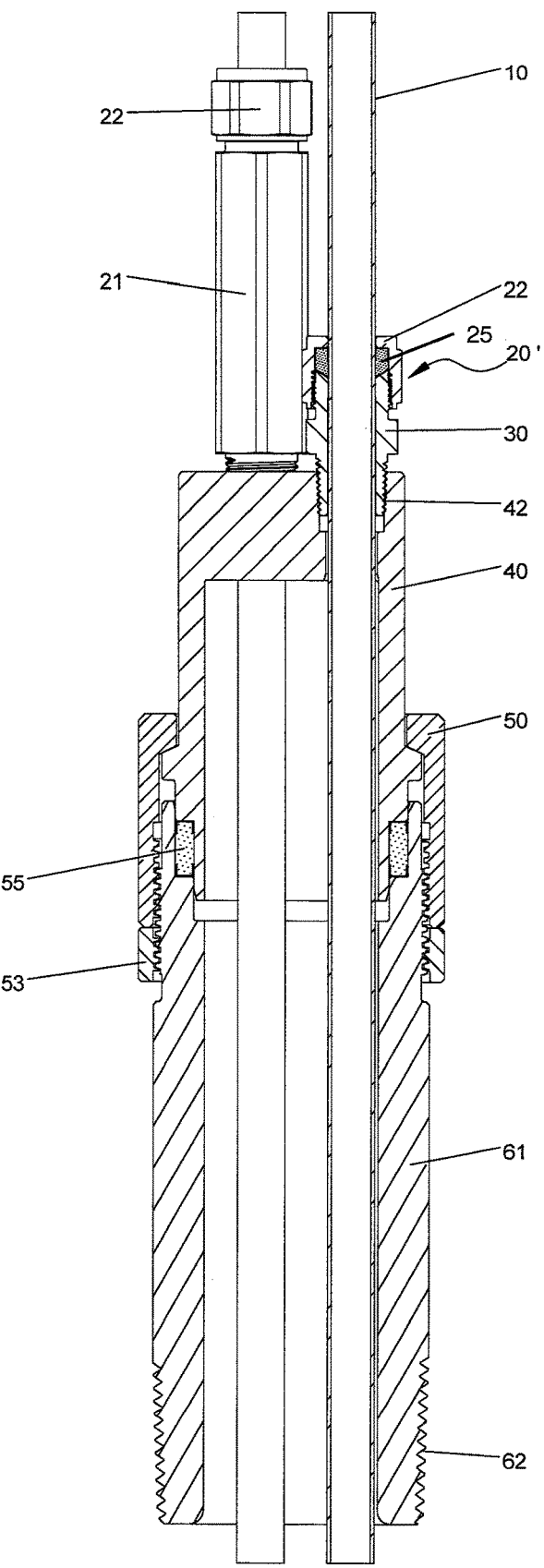
FIG. 6 is a cross-sectional view of an alternative embodiment using non-metallic seals in both the manifold bushing and the top nut.

FIG. 6 shows an alternative embodiment sealing the manifold bushing 61 as in FIG. 5, the individual tube 10 as described previously, however, instead of a metallic ferrule at 20', this embodiment uses a non-metallic compression ring 25 to seal the top ferrule seal between the first nut 22 and the top seal 30.

The invention claimed is:

1. A penetrator packer seal comprising:
   one or more tubes;
   a seal bushing having the one or more tubes extending at least partially therethrough;
   a ferrule seal connected to the seal bushing and compressing the one or more tubes; and
   a manifold bushing connected to the seal bushing, wherein the manifold bushing has the one or more tubes extending at least partially therethrough, and wherein the seal bushing provides a lipped lower edge for engaging a grooved edge of the manifold bushing.

2. The penetrator packer seal of claim 1 further comprising threads formed on an exterior end of the manifold bushing for connection to a packer.

3. The penetrator packer seal of claim 1 further comprising a second ferrule seal connected to and compressing the manifold bushing and the seal bushing.

4. The penetrator packer seal of claim 3 wherein the second ferrule seal further comprises a front ferrule seal and a rear ferrule seal.

5. The penetrator packer seal of claim 1 wherein the seal bushing and the manifold bushing are compressively sealed with a non-metallic seal.

6. A penetrator packer seal comprising:
   one or more tubes;
   a seal bushing having the one or more tubes extending at least partially therethrough;
   a first ferrule seal connected to the seal bushing and compressing at least one of the one or more tubes;
   a second ferrule seal connected to the seal bushing and compressing at least one of the one or more tubes, wherein the first ferrule seal and the second ferrule seal have different lengths;
   a manifold bushing connected to the seal bushing, wherein the manifold bushing has the one or more tubes extending at least partially therethrough; and
   a nut connected to the seal bushing and the manifold bushing, wherein the nut compresses the seal bushing and the manifold bushing.

7. The penetrator packer seal of claim 6 further comprising threads formed on an exterior end of the manifold bushing for connection to a packer.

8. A method for assembling a sealed packer penetrator comprising the steps of:
   sliding a manifold bushing over a first tube coming from a packer or a wellhead;
   threadably attaching the manifold bushing to the packer;
   sliding a manifold bushing nut over a seal bushing;
   sliding the seal bushing and the manifold bushing nut over the first tube;
   attaching the manifold bushing nut to the manifold bushing;
   sliding a first seal body onto a second tube;
   threadably attaching the first seal body to the seal bushing;
   sliding a first ring and a first nut onto the second tube;
   sliding a second seal body onto a third tube, wherein the second seal body has a greater length than the first seal body;
   threadably attaching the second seal body to the seal bushing;
   sliding a second ring and a second nut onto the third tube;
   sliding a third seal body onto a fourth tube;
   threadably attaching the third seal body to the seal bushing; and
   sliding a third ring and a third nut onto the fourth tube.

9. The method of claim 8 further comprising connecting the manifold bushing to the seal bushing using a fourth ring.

10. A method for assembling a sealed packer penetrator comprising the steps of:
    sliding a manifold bushing over one or more tubes;
    threadably attaching the manifold bushing to a packer;
    inserting a seal bushing through a manifold bushing nut;
    tightening the manifold bushing nut to the bushing manifold;
    inserting a top-hat seal through a top-hat nut;
    sliding that top-hat seal and the top-hat nut over the one or more tubes;
    seating the top-hat seal, the top-hat nut, or both onto the seal bushing with anti-torque pins; and
    attaching the top-hat seal to the seal bushing using the top-hat nut.

\* \* \* \* \*